(12) United States Patent
Sato et al.

(10) Patent No.: US 6,698,876 B2
(45) Date of Patent: Mar. 2, 2004

(54) AQUEOUS FLUORESCENT INK, RECORDING UNIT, INK CARTRIDGE, INK JET RECORDING APPARATUS, AND INK JET RECORDING METHOD

(75) Inventors: Shinichi Sato, Kanagawa (JP); Shoji Koike, Kanagawa (JP); Shinichi Hakamada, Kanagawa (JP); Hideki Takayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/057,970

(22) Filed: Jan. 29, 2002

(65) Prior Publication Data

US 2002/0109765 A1 Aug. 15, 2002

(30) Foreign Application Priority Data

Jan. 31, 2001 (JP) ........................................ 2001-024154

(51) Int. Cl.$^7$ ................................................. B41J 2/01
(52) U.S. Cl. ...................... 347/100; 347/95; 106/31.13; 106/31.15
(58) Field of Search ........................ 347/100, 96, 101, 347/95; 106/31.13, 31.6, 31.15

(56) References Cited

U.S. PATENT DOCUMENTS

| | | | | |
|---|---|---|---|---|
| 4,853,036 A | * | 8/1989 | Koike et al. | 347/100 |
| 5,124,718 A | | 6/1992 | Koike et al. | 346/1.1 |
| 5,681,381 A | | 10/1997 | Auslander et al. | 106/24 A |
| 5,769,930 A | * | 6/1998 | Sano et al. | 347/100 |
| 6,261,352 B1 | * | 7/2001 | Asami | 106/31.58 |

FOREIGN PATENT DOCUMENTS

| | | |
|---|---|---|
| JP | 5-239395 | 9/1993 |
| JP | 6-346013 | 12/1994 |
| JP | 9-291246 | 11/1997 |

OTHER PUBLICATIONS

U.S. patent application Ser. No. 10/021,0912 Nagashima et al., filed on Dec. 19, 2001, Group Art Unit 3653, Status pending.

* cited by examiner

Primary Examiner—Stephen Meier
Assistant Examiner—Manish Shah
(74) Attorney, Agent, or Firm—Fitzpartick, Cella, Harper & Scinto

(57) ABSTRACT

There is provided an aqueous fluorescent ink that contains an emulsified colored resin and a water-soluble compound having ethylene oxide units that is solid at 25° C.

14 Claims, 3 Drawing Sheets

AQUEOUS FLUORESCENT INK, RECORDING UNIT, INK CARTRIDGE, INK JET RECORDING APPARATUS, AND INK JET RECORDING METHOD

BACKGROUND OF THE INVENTION

1. Field of the Invention

The present invention relates to an aqueous fluorescent ink for ink jet recording, where recording is carried out by discharging ink droplets using thermal energy. The present invention also relates to an ink cartridge, a recording unit, an ink jet recording apparatus, and an ink jet recording method using this ink.

2. Related Background Art

Fluorescent coloring materials have been used for line markers etc., and recently, inks using fluorescent pigments for improved durability have appeared. For example, Japanese Patent Application Laid-Open Nos. 6-346013 and 5-239395 disclose fluorescent pigment inks using organic fluorescent pigments for writing utensils.

In addition to the above-described use, fluorescent ink has been used for printing watermarks, indicia and the like.

Japanese Patent Application Laid-Open No. 9-291246 discloses application of an ink jet printer for such printing, where the water-proof ink composition using a soluble toner contains a nonionic surfactant having an H. L. B. (Hydrophile Lipophile Balance) of 8 to 15 as a solubilizing agent.

If the fluorescent intensity of a printed watermark or indicia is utilized as a threshold value, stable fluorescence emission is important. However, stable fluorescence intensity is not always obtained with the above-described prior arts.

Further, in the ink jet recording system utilizing thermal energy for ink ejection (so-called bubble jet system), steady bubble formation is required for steady ink ejection. The above-described inks are not satisfactory from such a point of view.

SUMMARY OF THE INVENTION

An object of the present invention is to provide an aqueous fluorescent ink capable of emitting stable fluorescence and excellent in ink discharging properties for ink jet recording, especially for bubble-jet recording, and further to provide a recording unit, an ink cartridge, an ink jet recording apparatus, and an ink jet recording method that can stably form images of high quality and durability owing to the excellent ejection properties of the ink.

The above-described purpose can be achieved as follows.

According to one aspect of the present invention, there is provided an aqueous fluorescent ink for ink jet recording that comprises: an emulsified resin colored with a fluorescent dye, and a water-soluble compound being solid at 25° C. and having ethylene oxide units.

In the above-described ink, the emulsified resin is preferably an emulsified acrylic resin polymer.

According to still another aspect of the present invention, there is provided a recording unit that comprises an ink container storing an aqueous fluorescent ink described above and an ink jet head for discharging the ink.

According to still another aspect of the present invention, there is provided an ink cartridge storing an aqueous fluorescent ink described above.

According to still another aspect of the present invention, there is provided an ink jet recording apparatus that comprises an ink container storing an aqueous fluorescent ink described above.

According to still another aspect of the present invention, there is provided an ink jet recording method that comprises the step of discharging an aqueous fluorescent ink described above by an ink jet method.

DETAILED DESCRIPTION OF THE PREFERRED EMBODIMENTS

Figure 1:
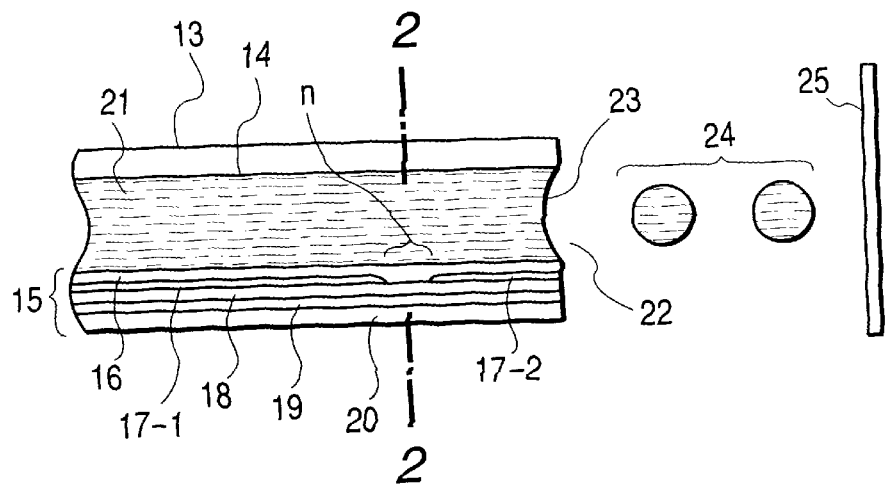
FIG. 1 is a longitudinal section showing one example of the head of an ink jet recording apparatus.

The present invention is described in more detail referring to preferred embodiments.

[Emulsified Colored Resin]

In the present invention, ink contains an emulsified resin colored with a fluorescent dye as a coloring component, for example, an emulsified acrylic polymer dyed with a fluorescent dye.

As the fluorescent dye, any dye can be used so long as it fluoresces. Examples are acid dyes such as C.I. Acid Blue 9, C.I. Acid Yellow 7, C.I. Acid Yellow 23, C.I. Acid Red 52, C.I. Acid Red 87, C.I. Acid Red 92, C.I. Acid Black 2 and the like; and basic dyes such as C.I. Basic Red 1, C.I. Basic Yellow 9, C.I. Basic Yellow 44, C.I. Basic Violet 1, C.I. Basic Violet 7, C.I. Basic Violet 10, C.I. Basic Violet 11, C.I. Basic Blue 45 and the like, but not restricted to thereto.

The monomer usable for the emulsified polymer includes, in addition to acrylic acid and methacrylic acid, styrene and vinyl chloride; esters of acrylic acid and methacrylic acid; maleic acid, fumaric acid and their esters; vinyl monomers such as acrylonitrile, and further urethane-type monomers, but is not limited thereto.

A method of producing the emulsified polymer is to carry out polymerization or copolymerization of one or more of the above-described monomers in a solvent such as water. The method of polymerization or copolymerization is not particularly limited, but synthesis by emulsion polymerization is preferable.

The acrylic polymer can be dyed with any dye so long as it can dye the polymer, and an emulsion of dyed acrylic polymer can be obtained by reacting a dye with a monomer before or during polymerization or by dyeing the polymer after polymerization.

The dye content of the polymer depends on the dye type, but preferably not less than 1% by weight and not more than 10% by weight. If the dye content is lower than this range, coloring is sometimes insufficient, whereas the dye content higher than this range may result in insufficient water fastness or quenching of fluorescence due to high concentration.

[Water-soluble Compound having Ethylene Oxide Units and being Solid at 25° C.]

The ink of the invention contains, as an essential component, a water-soluble compound being solid at 25° C. and containing ethylene oxide units (—CH$_2$CH$_2$O—). Hereinafter, such a compound may be referred to as a solid polyoxyethylene compound.

The solid polyoxyethylene compound is not particularly limited so long as it is a watersoluble compound that is solid at 25° C. and contains ethylene oxide units, but preferably is polyethylene glycol or a nonionic surfactant being solid at 25° C.

More particularly, polyethylene glycols and nonionic surfactants containing 25 or more ethylene oxide units are preferable.

In the case of polyethylene glycol, the ethylene oxide unit number is preferably 200 or less.

In the case of a nonionic surfactant, the ethylene oxide unit number is preferably 60 or less.

The above-described nonionic surfactant includes polyoxyethylene lauryl ether, polyoxyethylene cetyl ether, polyoxyethylene stearyl ether, polyoxyethylene oleyl ether, polyoxyethylene nonylphenyl ether, polyoxyethylene octylphenyl ether, polyoxyethylene stearylamine, polyoxyethylene and the like, having ethylene oxide units of 25 or more, but, of course, is not limited thereto.

The reason why such a solid polyoxyethylene compound can stabilize the fluorescence of the ink-jet recorded matter is not clear. It is presumed that such a compound may suppress the concentration quenching (decrease in fluorescence intensity due to the absorption of fluorescence by other coloring components).

Also, the reason why such a compound can improve the ejection properties of the ink in the bubble jet recording is not clear, but is considered as follows.

When the ink contains the above-described colored resin emulsion, the hydrophobic portion of the emulsified resin may prevent the bubble from growing into a sufficient size for ink ejection resulting in unstable ejection.

While polyethylene glycol having 20 or so ethylene oxide units and that is liquid at 25° C. is freely miscible with water, polyethylene glycol that is solid at 25° C. has a limited solubility and probably less affinity to water. Thus such a solid polyoxyethylene compound is oriented to the more hydrophobic emulsified colored resin to increase the apparent hydrophilicity of the emulsified resin, which restores the bubble growth suppressed by the emulsified colored resin to achieve stable ink ejection.

To the nonionic surfactant, the above-described explanation can also be applied. In this case, the surfactant having a hydrophobic portion can be oriented to the emulsified fluorescent resin more effectively, so that the amount and the length of ethylene oxide units of the surfactant to achieve the same effect is small in comparison with the above polyethylene glycol.

If the surfactant is small in the number of ethylene oxide units and not solid at 25° C., the surfactant cannot be dissolved to an effective concentration or cannot moderate hydrophobicity of the emulsified colored resin effectively due to the stronger hydrophobicity. Therefore, sufficient effect cannot be obtained.

[Ink]

The aqueous fluorescent ink for ink jet recording of the invention can be produced as a solution in which a colored resin is dispersed as a kind of pigment in an aqueous medium such as water by mixing the emulsified colored resin and the solid polyoxyethylene compound described above.

Yet the content of the emulsified colored resin is determined depending on the dye concentration in the resin, it is 1 to 40% by weight, preferably 1 to 20% by weight in the ink.

The polyoxyethylene compound that is solid at 25° C. is preferably contained at 1 to 15% by weight in the ink. By adjusting the content to be 1% by weight or more, the effect of the invention is made obvious and by suppressing the content to be 15% by weight or lower, the viscosity increase of the ink can be suppressed. Further, with the content higher than 15% by weight, the effect of the invention is not improved so much.

In a preferred embodiment, polyethylene glycol is contained at 1 to 10% by weight or the nonionic surfactant is contained at 1 to 5% by weight in the ink. This is because even if they are contained at more than 10% by weight or 5% by weight respectively, disadvantageously the effect is not improved so much, and increased viscosity may cause clogging in the nozzle of an ink jet head.

These compounds may be preferably used in combination.

The aqueous medium suitable for the ink of the invention is a mixture of water and a water-soluble organic solvent. It is preferable to use ion exchanged water (deionized water), not ordinary water containing a variety of ions.

The water-soluble organic solvent to be used with water includes alkyl alcohols of 1 to 4 carbons such as methyl alcohol, ethyl alcohol, n-propyl alcohol, isopropyl alcohol, n-butyl alcohol, sec-butyl alcohol, tert-butyl alcohol, and the like; amides such as dimethylformamide, dimethylacetoamide; ketones or ketoalcohols such as acetone and diacetone alcohol; ethers such as tetrahydrofuran and dioxane; polyalkylene glycols such as polyethylene glycol, polypropylene glycol, and the like; alkylene glycols containing alkylene groups of 2 to 6 carbon atoms such as ethylene glycol, propylene glycol, butylene glycol, triethylene glycol, 1,2,6-hexanetriol, thiodiglycol, hexylene glycol, diethylene glycol, and the like; glycerin; lower alkyl ethers of a polyhydric alcohol such as ethylene glycol monomethyl (or ethyl) ether, diethylene glycol methyl (or ethyl) ether, triethylene glycol monomethyl (or ethyl) ether, and the like; N-methyl-2-pyrrolidone; 2-pyrrolidone; 1,3-dimethyl-2-imidazolidinone; and the like. Among a large number of these water-soluble organic solvents, polyhydric alcohols such as diethylene glycol and lower alkyl ethers of polyhydric alcohols such as triethylene glycol monomethyl (or ethyl) ether are preferable.

The content of the above-described water-soluble organic solvent is generally preferably 3 to 50% by weight, more preferably 3 to 30% by weight, of the total weight of the ink.

[Recording Apparatus]

Next, one example of an ink jet recording apparatus of the invention suitable for carrying out recording using the above-described water-based pigment ink of the invention will be described below. The apparatus is not particularly limited in the invention so long as the apparatus is provided with either an ink container storing the ink or an ink cartridge containing an ink container storing the ink and also with a recording unit comprising a head part for discharging the ink in the form of ink droplets by the function of thermal energy and the ink is the above-described water-based fluorescent pigment ink of the invention.

Figure 2:
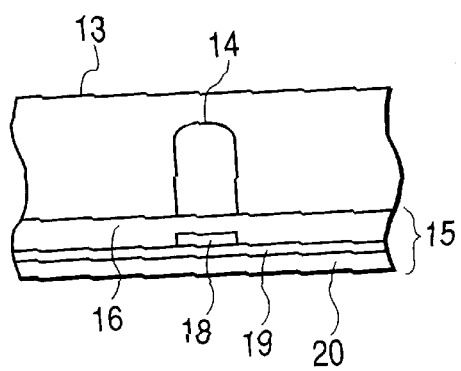
FIG. 2 is a cross-sectional view showing one example of a head of an ink jet recording apparatus.

At first, one example of the head constitution is illustrated in FIG. 1 and FIG. 2. FIG. 1 is a cross-sectional view of a head 13 along the ink flow path and FIG. 2 is a cross-sectional view taken along the line 2—2 in FIG. 1. The head 13 is obtained by sticking a glass, ceramic, silicon, or plastic plate having a flow path (a nozzle) 14 where the ink passes through and a heat generating element substrate 15 to each other. The heat generating element substrate 15 comprises a protective layer 16 of silicon oxide, silicon nitride, silicon carbide or the like, electrodes 17-1 and 17-2 made of aluminum, gold, an aluminum-copper alloy or the like, a heat-generating resistor layer 18 made of a high melting point material such as HfB2, TaN, TaAl or the like, a heat storage layer 19 made of a thermally oxidized silicon, aluminum oxide or the like, and a substrate 20 made of a material with high heat releasing property such as silicon, aluminum, aluminum nitride or the like.

Figure 3:
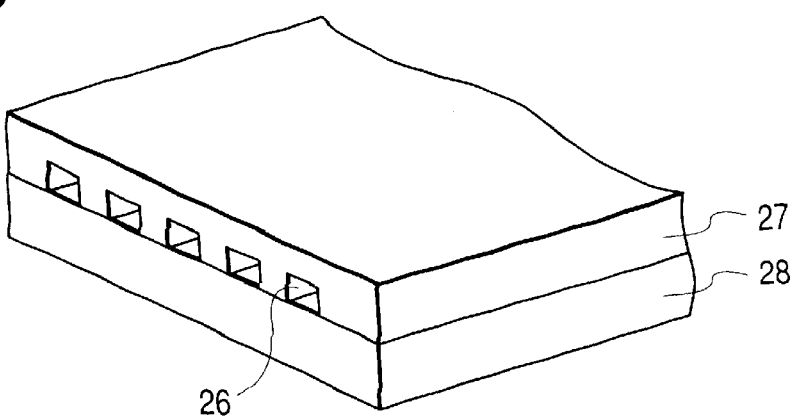
FIG. 3 is a perspective view of a multiplex head made from that shown in FIG. 1.

When electric pulse signals are applied to the electrodes 17-1 and 17-2 of the above head 13, the region designated with n of the heat generating substrate 15 rapidly generates heat; thereby a bubble is formed in the ink 21 in contact with the above region. Due to the pressure of the bubble, the meniscus 23 protrudes to eject the ink 21 through the nozzle 14 of the head, and the ink ejected from a discharge orifice 22 as a droplet flies toward and lands on a recording medium 25. FIG. 3 shows an outer view of one example of the multi-nozzle type recording head in which the nozzles shown in FIG. 1 are lined up in an integral unit. This multi-nozzle type recording head is prepared by gluing a glass plate 27 having plural nozzles 26 and a heat generating substrate 28 as described in FIG. 1.

Figure 4:
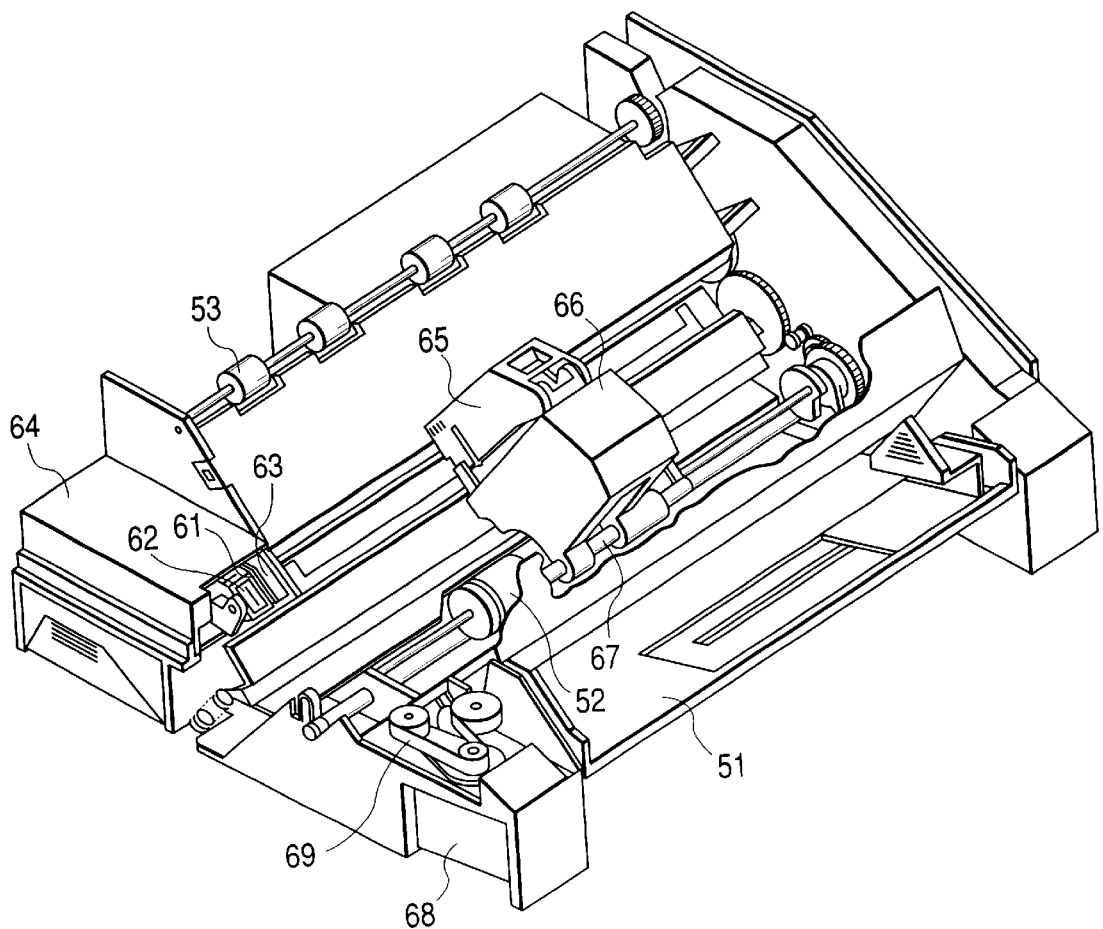
FIG. 4 is a schematic perspective view showing one example of an ink jet recording apparatus.

FIG. 4 shows one example of the ink-jet recording apparatus in which such a head is incorporated. In FIG. 4, reference numeral 61 designates a blade as a wiping member which is supported with and fixed to a blade-supporting member at one end to form a cantilever. The blade 61 is arranged in a position adjacent to the recording region of a recording head 65. In this example, the blade is held in a projecting form in the path along which the recording head 65 moves.

Reference numeral 62 designates a cap for an ejection opening of the recording head 65. The cap is arranged in a home position adjacent to the blade 61 and moves in the direction perpendicular to the moving direction of the recording head 65 so as to cap the ink-ejecting opening when touching it. Numeral 63 designates an ink-absorber provided adjacent to the blade 61, which is held in the moving path of the recording head 65 in a projecting form like the blade 61. The above blade 61, cap 62 and ink-absorber 63 constitute an ejection recovery portion 64, and the blade 61 and the ink-absorber 63 serve to remove moisture and dust on the ink-ejecting opening.

Reference numeral 65 designates a recording head. The head contains a means for generating ink-ejecting energy and performs recording by ejecting ink towards a recording medium opposite to the ink-ejecting opening. Numeral 66 designates a carriage for carrying the recording head 65 so that it can move. The carriage 66 is engaged with a guide shaft 67 in a slidable manner, and a part of the carriage 66 is connected to a belt 69 (not shown in the figure) driven by a motor 68.

Thus the carriage 66 can move along the guide shaft 67, and the recording head 65 can move in the recording region and the region adjacent thereto.

Reference numeral 51 designates a paper feeding portion for inserting a recording medium and numeral 52 designates a paper-delivery roller driven by a motor not shown in the figure. With such an arrangement, the recording medium is fed to the position opposite to the ink ejecting opening of the recording head 65 and conveyed to a paper output portion provided with a paper output roller 53 as recording proceeds. In the above arrangement, while the recording head returns to its home position after recording, the cap 62 of the ejection recovery portion 64 evacuates from the moving path of the recording head, but the blade 61 is projecting in the moving path. As a result, the ink ejecting opening of the recording head 65 is wiped.

The cap 62 moves into the moving path of the recording head 65 in a projecting manner to touch the ejection opening of the head 65 for capping. While the recording head 65 is moving from its home position to the recording start position, the cap 62 and the blade 61 take the same position as when wiping is carried out. As a result, the ejection opening of the head 65 is wiped even during this movement. The recording head returns to its home position not only after completion of recording and during ejection recovery, but also returns to the home position adjacent to the recording region at prescribed intervals while moving in the recording region. With this movement, the above wiping is also carried out.

Figure 5:
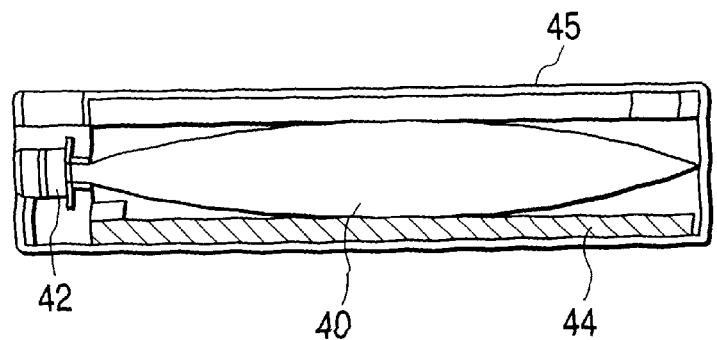
FIG. 5 is a longitudinal section showing one example of an ink cartridge.

FIG. 5 shows one example of an ink cartridge which stores and feeds ink to the recording head through an ink feeding member, such as a tube. In the drawing, reference numeral 45 denotes a member constituting the ink cartridge with an ink storage portion such as an ink bag 40, and a tip equipped with a rubber stopper 42. The ink in the ink bag 40 can be fed to the recording head by inserting a needle (not shown in the figure) into the stopper 42. Numeral 44 designates an ink absorber for receiving waste ink. For the ink storage portion, its surface in contact with ink is preferably made of polyolefin, particularly polyethylene.

The ink cartridge of the invention is not particularly restricted, so long as it is provided with an ink container storing an ink, and the ink to be stored is an aqueous fluorescent ink of the present invention.

Figure 6:
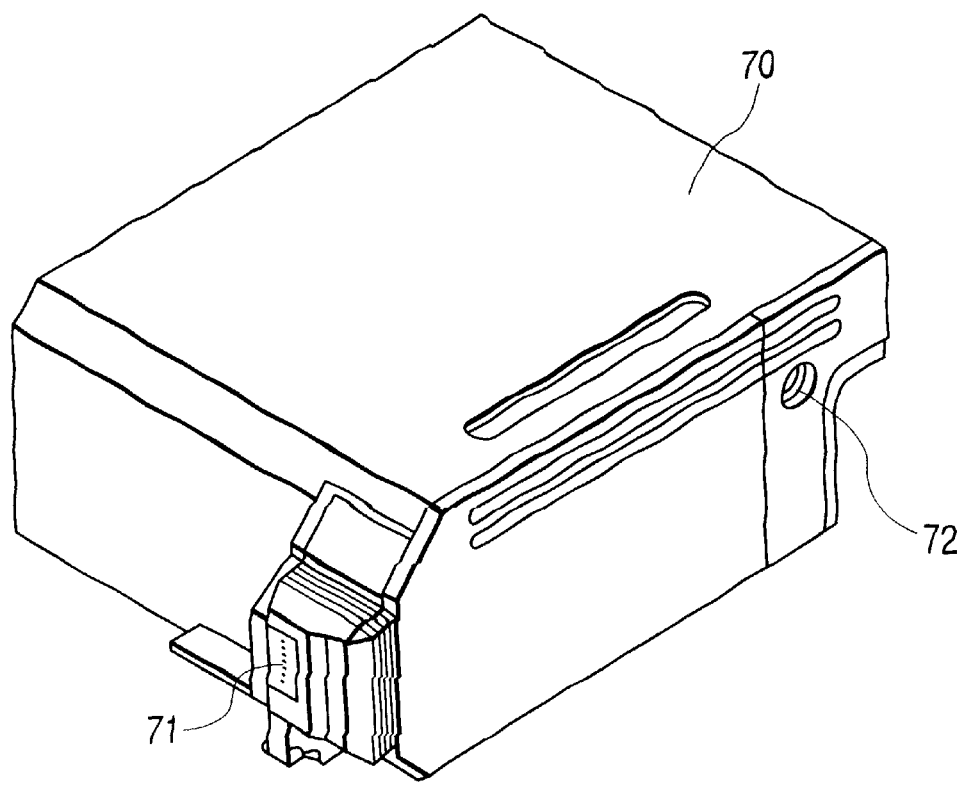
FIG. 6 is a perspective view showing one example of a recording unit.

The ink-jet recording apparatus for use in the present invention is not limited to the aforementioned type in which an ink cartridge is not furnished as an integral part of the head. The type in which the above two are integrated into one part as shown in FIG. 6 is also preferably used. In FIG. 6, reference numeral 70 designates a recording unit which contains an ink storage portion for storing ink, for example, an ink absorber. In the arrangement of the above unit, ink in the ink absorber is ejected as an ink droplet from a head portion 71 having multiple orifices in it. As a material for the ink absorber, polyurethane is preferably used in the present invention. An ink bag having a spring within it may be used for an integrated ink cartridge and head in which no ink absorber is used. Numeral 72 designates an opening for connecting the inside of the cartridge with air. This recording unit 70 is used in place of the recording head 65 shown in FIG. 4 and detachably attached to the carriage 66.

As the recording unit of the invention, any recording unit can be employed without any restriction so long as it is provided with an ink container and a head for discharging the ink in the form of an ink droplet by the action of thermal energy, and the ink to be stored is an aqueous fluorescent pigment ink of the invention.

EXAMPLES

Next, the invention is described more specifically with reference to Examples and Comparative Examples, yet the invention is not at all limited to the following examples. Hereinafter, "part" and "%" are by weight unless otherwise mentioned.

Example 1

1) Water Based Fluorescent Colored Resin Emulsion
   Emulsified acrylic resin colored with a fluorescent acid dye (trade name: SF-5017; made by Sinloihi Co., Ltd.): 20 parts
2) Nonionic Surfactant
   Polyoxyethylene cetyl ether (40 ethylene oxide units), solid at 25° C. (trade name: BC-40TX; Nikko Chemicals Co., Ltd.): 2.0 parts 3) Other Components Acetylene glycol ethylene oxide adduct (tradename: Acetylenol EH; Kawaken Fine Chemicals Co., Ltd.): 0.5 parts Diethylene glycol: 15 parts Trimethylol propane: 5 parts Pure water: 57.5 parts The above-described components were mixed and sufficiently stirred to be dissolved and then pressure-filtered through a microfilter of a pore size of 2.5 μm (made by Fuji Photo Film Co., Ltd.) to produce an ink.

Printing was carried out and evaluated using thus-obtained ink and an ink jet recording apparatus BJC-430J (made by Canon Inc.) provided with an on-demand type multiple recording head for discharging ink by applying thermal energy to the ink according to the recording signals.

PPC paper and PB paper (products of Canon Inc.) were used for printing.

As a result, stable printing was achieved, and the printed matter showed perfect water-fastness. The printed matter was subjected to measurement by a fluorometer, and red fluorescence was observed and no fluctuation of the fluorescence intensity was observed due to the paper lot.

Example 2

1) Water Based Fluorescent Colored Resin Emulsion

Emulsified acrylic resin colored with a fluorescent acid dye (trade name: LUMIKOL NKW-3207C; made by Nihon Keiko): 15 parts 2) Polyethylene Glycol Polyethylene glycol (M.W. 4000, average ethylene oxide units about 90), solid at 25° C.: 7.0 parts 3) Other Components Diethylene glycol: 15 parts Trimethylol propane: 5 parts Acetylene glycol ethylene oxide adduct (trade name: Acetylenol EH; Kawaken Fine Chemicals Co., Ltd.): 0.5 part Pure water: 57.5 parts Printing evaluation was carried out in the same manner as in Example 1, except that the above-described components were employed and excellent results were obtained. Further, red fluorescence emission was observed in Example 2 and the fluorescence intensity was also stable similarly to the results of Example 1.

Example 3

1) Water Based Fluorescent Colored Resin Emulsion

Emulsified acrylic resin colored with a fluorescent acid dye (trade name: SF-5017; made by Sinloihi Co., Ltd.): 30 parts 2) Polyethylene Glycol and Nonionic Surfactant Polyethylene glycol (M.W. 1000, average number of ethylene oxide units ca. 25, solid at 25° C.): 5.0 parts Polyoxyethylene oleyl ether (50 ethylene oxide units), solid at 25° C. (trade name: BO-50; Nikko Chemicals Co., Ltd.): 2.0 parts 3) Other Components Acetylene glycol ethylene oxide adduct (trade name: Acetylenol EH; Kawaken Fine Chemicals Co., Ltd.): 0.5 part Diethylene glycol: 15 parts Trimethylol propane: 5 parts Pure water: 42.5 parts Printing evaluation was carried out in the same manner as in Example 1, except that the above-described components were employed. Excellent results were obtained. Yellow-green fluorescence emission was observed and the fluorescence intensity was also stable similarly to the results of Example 1. In Example 3, combined use of polyethylene glycol and the surfactant enabled a stable ink containing the emulsified resin in a higher concentration.

Comparative Example 1

1) Water Based Fluorescent Colored Resin Emulsion

Emulsified acrylic resin colored with a fluorescent acid dye (trade name: SF-5017; made by Sinloihi Co., Ltd.): 20 parts 2) Other Components Acetylene glycol ethylene oxide adduct (trade name: Acetylenol EH; Kawaken Fine Chemicals Co., Ltd.): 0.5 part Diethylene glycol: 15 parts Trimethylol propane: 5 parts Pure water: 59.5 parts Printing was carried out in the same manner as in Example 1, but no ink was ejected from the printing head making evaluation completely impossible.

Comparative Example 2

1) Water Based Fluorescent Colored Resin Emulsion

Emulsified acrylic resin colored with a fluorescent acid dye (trade name: SF-5017; made by Sinloihi Co., Ltd.): 20 parts 2) Nonionic Surfactant Polyoxyethylene cetyl ether (10 ethylene oxide units), liquid at 25° C. (trade name: BC-10TX; Nikko Chemicals Co., Ltd.): 2.0 parts 3) Other Components Acetylene glycol ethylene oxide adduct (trade name: Acetylenol EH; Kawaken Fine Chemicals Co., Ltd.): 0.5 part Diethylene glycol: 15 parts Trimethylol propane: 5 parts Pure water: 57.5 parts Printing evaluation was carried out in the same manner as in Example 1, but the print was blurred, making evaluation difficult.

Fluorescence intensity was measured at the portion of apparently good printing. As a result, the fluorescence intensity was uneven and not at a level usable for water-marks etc., although the print density was visually sufficient.

Comparative Example 3

1) Water Based Fluorescent Colored Resin Emulsion

Emulsified acrylic resin colored with a fluorescent acid dye (trade name: SF-5017; made by Sinloihi Co., Ltd.): 20 parts 2) Polyethylene Glycol Polyethylene glycol (M.W. 200, liquid at 25° C.): 5.0 parts 3) Other Components Acetylene glycol ethylene oxide adduct (trade name: Acetylenol EH; Kawaken Fine Chemicals Co., Ltd.): 0.5 part Diethylene glycol: 15 parts Trimethylol propane: 5 parts Pure water: 54.5 parts Printing was carried out in the same manner as in Example 1, but no ink was ejected from the printing head making evaluation completely impossible.

As described above, according to the present invention, an aqueous fluorescent ink for bubble jet recording that has excellent ink ejection properties and can form images having excellent durability can be obtained. Further, the invention provides an ink cartridge, a recording unit, and an ink jet recording apparatus that can provide high quality images stably, and fluorescent images of high durability using the ink.

What is claimed is:

1. An aqueous fluorescent ink for ink jet recording comprising an emulsified resin colored with a fluorescent dye, and a water-soluble compound being solid at 25° C. and having ethylene oxide units, wherein the water-soluble compound is contained at 1 to 15% by weight of the total weight of the ink.

2. The ink of claim 1, wherein the resin is an acrylic resin.

3. The ink of claim 1, wherein the water-soluble compound is a polyethylene glycol.

4. The ink of claim 3, wherein the polyethylene glycol has 25 or more ethylene oxide units.

5. The ink of claim 3, wherein the ink contains the polyethylene glycol at 1 to 10% by weight of the total weight of the ink.

6. The ink of claim 1, wherein the water-soluble compound is a nonionic surfactant.

7. The ink of claim 6, wherein the nonionic surfactant has 25 or more ethylene oxide units.

8. The ink of claim 6 or 7, wherein the nonionic surfactant is contained at 1 to 5% by weight of the total weight of the ink.

9. The ink of claim 1, wherein the water-soluble compound is a polyethylene glycol and a nonionic surfactant.

10. A recording unit comprising an ink container storing an aqueous fluorescent ink as set forth in claim 1 and an ink jet head for discharging the ink.

11. An ink cartridge storing an aqueous fluorescent ink as set forth in any one of claims 1, 2, or 3 to 9.

12. An ink jet recording apparatus comprising an ink container storing an aqueous fluorescent ink as set forth in claim 1 and an ink jet head for discharging the ink.

13. The ink jet recording apparatus of claim 12, wherein the ink jet head is a thermal ink jet head.

14. An ink jet recording method comprising the step of discharging an aqueous fluorescent ink as set forth in claim 1 by an ink jet method.

* * * * *

UNITED STATES PATENT AND TRADEMARK OFFICE
CERTIFICATE OF CORRECTION

PATENT NO. : 6,698,876 B2
DATED : March 2, 2004
INVENTOR(S) : Shinichi Sato et al.

It is certified that error appears in the above-identified patent and that said Letters Patent is hereby corrected as shown below:

Column 2,
Line 60, "preferably" should read -- is preferably --.

Column 3,
Line 7, "watersoluble" should read -- water-soluble --.

Column 4,
Line 20, "ion exchanged" should read -- ion-exchanged --.

Column 5,
Line 4, "HfB2," should read -- $HfB_2$, -- and "TaAI" should read -- TaA1 --.

Column 9,
Line 14, "prising" should read -- prising: --.

Column 10,
Line 14, "claims 1, 2, or 3 to 9." should read -- claims 1 to 9. --.

Signed and Sealed this

Sixth Day of July, 2004

JON W. DUDAS
*Acting Director of the United States Patent and Trademark Office*